United States Patent Office 3,580,872
Patented May 25, 1971

3,580,872
READY-TO-USE PHENOLIC ADHESIVES
Alan L. Lambuth, Bellevue, Wash., assignor to
Monsanto Company, St. Louis, Mo.
No Drawing. Filed Oct. 22, 1968, Ser. No. 769,702
Int. Cl. C08g *51/14;* C08h *17/26*
U.S. Cl. 260—17.2R                                11 Claims

ABSTRACT OF THE DISCLOSURE

A ready-to-use phenolic adhesive for the manufacture of plywood is described which contains a micronized solid residue of the acid hydrolysis of pentosan-containing materials. The adhesive is prepared by digesting the micronized solid residue in an alkali solution and then reacting phenol and formaldehyde in the solution containing the residue.

BACKGROUND OF THE INVENTION

This invention relates to phenolic adhesive compositions.

The use of phenol-aldehyde resins in plywood adhesive compositions is a highly developed art. Phenolic resins alone are not generally suitable as plywood adhesives. Such resins require the addition of fillers and modifiers to achieve suitable plywood adhesive properties, such as resistance to absorption into dry wood, resistance to excessive flow in the hot press and water-holding in the adhesive film.

Many fillers are known and used with phenolic resins in plywood adhesive compositions. Adhesives employing phenolic resins are formulated just prior to use because of the poor stability of phenolic resin and filler in admixture. The fillers have a general tendency to settle or float out of the resin during storage in a relatively short time, or the mixed adhesives thicken or thin out rapidly. The preparation of ahesives is a time consuming, economic burden to the plywood industry. Further, it is truly a chemical process, often conducted in a plywood mill by relatively unskilled personnel and, as a result, is poorly controlled.

In Ash et al. 2,728,869, a basic teaching in the art is presented for using a granular to finely divided solid residue remaining after the acid hydrolysis of pentosan-containing materials as a filler for phenol-aldehyde resins in adhesive compositions useful in the manufacture of plywood. The solid residue is digested with an alkali and then a phenolformaldehyde resin is admixed therewith.

SUMMARY

This invention is directed to stable ready-to-use phenolic hot press adhesives suitable for manufacturing plywood.

Accordingly, typical objects of this invention are to provide (1) a ready-to-use phenolic resin adhesive, (2) a stable phenolic resin-filler adhesive composition, (3) a concentrated phenolic adhesive composition, and (4) an improved method of preparing stable phenolic resin-filler adhesive compositions.

Broadly, in accordance with this invention, the above objects are achieved by digesting a solid furfural by-product residue from the acid hydrolysis of a pentosan-containing material having a particle size distribution such that at least 75 percent passes a 325-mesh standard screen and at least 50 percent passes a 400-mesh standard screen with an alkali and then reacting phenol and formaldehyde in the presence of an alkali and the digested solid residue.

As previously indicated, the filler applicable to this invention is a micronized solid residue remaining after the acid hydrolysis of pentosan-containing materials, for example, ground oat hulls, ground corn cobs and the like, and the removal of the furfural and other chemical products produced thereby the steam distillation, solvent extraction, etc. The residue is dispersed and reacted with an alkali metal hydroxide or salt in water which provides a strong basic solution in which phenol and formaldehyde are reacted to provide the novel adhesive composition of this invention wherein the residue becomes part of the resin structure.

The residue as employed in this invention is ground either wet or dry to a micron particle size distribution having the following standard screen analysis:

|  | Percent through— | |
| --- | --- | --- |
|  | Minimum | Preferred |
| Screen size: | | |
| 325 mesh | 75 | 85 |
| 400-mesh | 50 | 60 |

Such micronized residue has a specific surface of at least about 4,500 cm.$^2$/gm. The residue can be as fine as is practical to obtain, such as dust collector flour which has a specific surface of about 10,000 to 15,000 cm.$^2$/gm. The residue is termed fine grind furafil.

Suitable phenol-aldehyde resins which are applicable to this invention are described in Van Epps 2,360,376; Stephan et al. 2,437,981; Redfern 2,457,493 and Re. 23,347; and the like.

The alkaline catalyzed phenol-formaldehyde resole resin employed in this invention preferably has a mol ratio of phenol to formaldehyde of 1:1.8 to 1:2.25.

Since the resin solids content of various suitable phenol-aldehyde adhesives is not constant, the ratio of the solid residue remaining after the acid hydrolysis of the pentosan-containing material to the resin adhesive is generally based on parts by weight of said residue to parts by weight of resin solids as determined by the P.M.M.A. method, said method consisting essentially of heating a known quantity of liquid resin for 3 hours at 135° C. and calculating the percent solids from the loss in weight of the original sample in the heating process. In general, adhesive compositions containing up to about 25 parts of residue and preferably from about 5 to about 25 parts of residue per 100 parts of resin solids provide adhesive compositions which are suitable for bonding wood structures which are exposed to the elements, for example, exterior-grade plywood.

The solid residue remaining after the acid hydrolysis of the pentosan-containing material is digested for a period from about 10 to about 30 minutes with an alkali metal compound from the group consisting of hydroxides, basic acting salts, a 0.1 N aqueous solution of which forms a strongly basic solution having a pH greater than about 9.5, and mixtures thereof, as for example, the lithium, sodium, and potassium hydroxides and carbonates, and the like. The quantity of basic alkali compound necessary to treat the residue ranges from about 10 to about 45 parts by weight of sodium hydroxide, or a substantially equivalent amount of another suitable alkali compound, or mixtures thereof, per 100 parts by weight of residue. The alkali solution can be prepared in a conventional manner by introducing the required quantity of alkali compound, or compounds, to a predetermined amount of water at room temperature (about 50 to about 70° F.) The alkali compound can be employed as the solid, or a more readily soluble form can be employed, as for example, 50 percent sodium hydroxide. Where commercial alkali solutions are employed the proper allowance must be made in the dilution water to obtain the proper final alkali concentration. In general it is preferable to prepare the alkali solution just prior to use of the adhesive composition. The residue first can be suspended in the dilution water or can be added after the alkali solution is prepared, the former procedure generally being preferred and an excess of alkali is generally employed in the digestion of the residue. In this manner the heat of reaction, solution, and dilution of the alkali aids the digestion of the residue. After the alkali is added to the suspended residue, agitation is continued for from about 10 to about 30 minutes or more.

The predetermined quantities of phenol and formaldehyde are added to the residue slurry and the temperature of the mixture is raised to 150° F. and optionally held thereat for about 1 hour. The mixture is then subjected to atmospheric reflux for about 25 minutes and then rapidly cooled to 180° F. by vacuum reflux. The mixture is maintained at 180° F. until a 70° F. MacMichael 26s viscosity in the range of 50 to 100 is reached when a predetermined second quantity of alkali is added and the temperature is reduced to about 170° F. and maintained thereat until the desired 70° F. MacMichael 26s viscosity is reached. The mixture is then rapidly cooled to about 120° F. and other additives, such as surfactants and defoamers, are added.

The novel adhesive composition of this invention can be further modified with extenders, i.e., amylaceous materials, fillers, hardening agents, antifoam agents, buffer salts, dyes, defoamers, and the like to provide special adhesive compositions for specific purposes. These are conventional modifiers well-known to those skilled in the art.

In general, the viscosity of the adhesive composition is not critical as long as the adhesive is spreadable in the conventional mechanical spreaders as employed in the plywood industry. A suitable range is from about 40 to about 1,000 as determined with the MacMichael viscosimeter with a number 26d wire at 70° F. This method of measuring viscosity is widely used in the plywood industry and further details of the procedure are disclosed in Stephan et al., supra. The adhesive compositions are stable for at least 2 weeks at 70° F. Stability is measured as the time required for the viscosity to double without any sedimentation.

The novel adhesive composition of this invention can be used in various applications requiring a thermosetting adhesive. However, it is particularly adapted to the bonding of wood veneer to provide plywood. The spread of the adhesive composition will vary with the type construction being employed and the ultimate intended end use of the plywood being bonded, but in general will range from about 30 to about 70 pounds of wet glue per thousand square feet of double glue line (MDGL). The assembly time ($T_A$) can vary from about 1 to about 40 minutes or more and preferably from about 3 to about 20 minutes. The press time ($T_P$) can vary from about 1¾ to about 25 minutes or more depending on the temperature of the platens, the type construction being bonded, the number of panels per opening, etc. The bonded plywood is normally hot-stacked to further advance the cure of the adhesive, thereby utilizing the heat gained during the pressing cycle. In general, platen temperatures of from about 240 to about 330° F. are recommended and the pressure should be from about 150 to 225 p.s.i. Hardwoods generally require a somewhat higher pressure and the upper limit of suitable pressure is the highest pressure which can be employed without effecting a substantial crushing action and permanent densification on the wood species being bonded.

As previously stated, the adhesive spread varies with the type of wood used. Generally, from about 35 to 45 pounds/MDGL is employed with nonabsorbing woods and from about 55 to 60 pounds/MDGL is employed with heavily absorbing woods. Also, different uses require different adhesive spreads, such as generally represented as follows:

| Use | Spread (lbs./MDGL) | |
|---|---|---|
| | Southern pine | Douglas fir |
| Exterior | 52–62 | 42–47 |
| Interior | 40–50 | 30–40 |
| Premium (Marine, etc.) | 60–70 | 50–60 |

The principal significant evaluation tests which indicate the utility of the plywood construction unit are shear tests which are set up to determine the relative strength of the glue bond to the wood species being bonded. The shear tests are run under various conditions, as for example, dry, boil, and vacuum-pressure tests and are reported as the shear stress necessary to break the test specimen along, or near, the glue line in pounds per square inch and the percent of wood failure present at the ruptured bond. Thus the figure 200–98 signifies that a shear stress of 200 p.s.i. was necessary to rupture the specimen and the wood failure was 98 percent.

The dry-shear tests are run on 1 x 3-inch shear samples which are scored to the glue line test from opposite sides, the two cuts being placed so as to apply the subsequently applied stress to a one-inch square area. The samples are conditioned for at least two days, then stressed under an applied load of 600 pounds per minute to destruction and examined for the percent of wood failure. The boil-shear tests are also run on similar shear samples but are subjected to 4-hours' immersion in boiling water, after which they are removed and dried at 145° F. for 20 hours, then again immersed in boiling water for 4 hours, removed and stressed to destruction while still wet.

The vac-press shear tests are also run on similar shear samples but are immersed in 70° F. water and subjected to 25 inches of mercury vacuum for 30 minutes, after which the vacuum is released and they are subjected to 70 p.s.i. water pressure for 30 minutes, removed and stressed to destruction while still wet.

DESCRIPTION OF PREFERRED EMBODIMENTS

The following examples are given as illustrative of the invention and are not presented as limitations upon the inventive concept disclosed. Where quantities are given as parts, they are parts by weight of the total adhesive composition. The fine-grind furafil employed has a particle size such that 85% passes a 325 screen and 60% passes a 400 screen.

Example I

This example illustrates the preparation of ready-to-use phenolic adhesives for use in the manufacture of plywood in accordance with this invention.

PART A

| Material: | Parts by weight | Molar proportion |
|---|---|---|
| Water | 28.2 | |
| Fine-grind furafil | 9.9 | |
| 50% aqueous sodium hydroxide | 6.6 | 0.36 |
| 100% phenol | 21.6 | 1.0 |
| 50% aqueous formaldehyde | 29.2 | 2.10 |
| 50% aqueous sodium hydroxide | 4.6 | 0.25 |

The water and fine-grind furafil are charged to a reactor equipped with means for agitation, cooling and reflux and then the charge is stirred to thoroughly wet the powdered extender. The first sodium hydroxide is charged to the reactor and the total charge is then thoroughly mixed. Next the phenol and formaldehyde are charged to the reactor slowly while maintaining the total charge mixture at 110–115° F. with cooling and/or refluxing. Next the temperature of the reaction mixture is slowly raised to 150° F., over a period of about 20 minutes, and maintained thereat for one hour. The reaction temperature is then raised to atmospheric reflux and after about a 25 minute reflux period the reaction mixture is rapidly cooled by vacuum reflux to 180° F. (and maintained thereat until a 70° F. viscosity of about 60 on the MacMichael 26s scale is reached). The second sodium hydroxide is charged and the temperature of the reaction mixture is reduced to 170° F. and maintained thereat until a 70° F. viscosity of aobut 2350 centipoises is reached. The reaction mixture is then cooled. The resulting adhesive contains about 45.5% total solids, has a 180° F. gel time of about 7990 seconds and a useful storage life of about 3 weeks at 70° F.

PART B

| Material: | Parts by weight | Molar proportion |
|---|---|---|
| Water | 31.9 | |
| Fine-grind furafil | 6.9 | |
| 50% aqueous sodium hydroxide | 7.3 | 0.40 |
| 100% phenol | 21.5 | 1.0 |
| 50% aqueous formaldehyde | 28.7 | 2.10 |
| 50% aqueous sodium hydroxide | 3.7 | 0.20 |

The procedure employed in Part A is followed except that the 70° F. viscosity reached is about 1475 centipoises. The resulting adhesive contains about 44.0% total solids and has a useful storage life of about 3 weeks at 70° F.

PART C

| Material: | Parts by weight | Molar proportion |
|---|---|---|
| Water | 28.9 | |
| Fine-grind furafil | 4.9 | |
| 50% aqueous sodium hydroxide | 6.8 | 0.36 |
| 100% phenol | 22.3 | 1.0 |
| 50% aqueous formaldehyde | 32.2 | 2.25 |
| 50% aqueous sodium hydroxide | 4.8 | 0.25 |

The procedure employed in Part B is followed. The resulting adhesive contains about 42.0% total solids and has a useful storage life of about 3 weeks at 70° F.

PART D

| Material: | Parts by weight | Molar proportion |
|---|---|---|
| Water | 29.4 | |
| Fine-grind furafil | 2.5 | |
| 50% aqueous sodium hydroxide | 7.4 | 0.36 |
| 100% phenol | 24.4 | 1.0 |
| 50% aqueous formaldehyde | 31.2 | 2.10 |
| 50% aqueous sodiu hydroxide | 5.1 | 0.25 |

The procedure employed in Part A is followed except that the 70° F. viscosity reached is about 1675 centipoises. The resulting adhesive contains about 43.7% total solids, has a 180° F. gel time of about 8700 seconds and a useful storage life of about 3 weeks at 70° F.

PART E

| Material: | Parts by weight | Molar proportion |
|---|---|---|
| Water | 30.2 | |
| Fine-grind furafil | 2.6 | |
| 50% aqueous sodium hydroxide | 7.7 | 0.40 |
| 10% phenol | 25.2 | 1.0 |
| 50% aqueous formaldehyde | 28.8 | 1.8 |
| 50% aqueous sodium hydroxide | 5.5 | 0.30 |

The procedure employed in Part A is followed except that the 70° F. viscosity reached is about 1315 centipoises. The resulting adhesive contains about 43% total solids and has a useful storage life of about 3 weeks at 70° F.

PART F

| Material: | Parts by weight | Molar proportion |
|---|---|---|
| Water | 28.9 | |
| Fine-grind furafil | 4.9 | |
| 50% aqueous sodium hydroxide | 6.8 | 0.36 |
| 100% phenol | 22.3 | 1.00 |
| 50% aqueous formaldehyde | 32.2 | 2.25 |
| 50% aqueous sodium hydroxide | 4.8 | 0.25 |

The procedure employed in Part A is followed except that the one-hour reaction period at 150° F. is eliminated and the charge is brought directly to atmospheric reflux. The resulting adhesive has a viscosity of about 2040 centipoises at 70° F., contains about 42.0% total solids, has a 180° F. gel time of about 5950 seconds and a useful storage life of about 2½ weeks at 70° F.

Example II

This example illustrates the preparation of an adhesive using an extender which is unsatisfactory.

| Material: | Parts by weight | Molar proportion |
|---|---|---|
| Water | 30.2 | |
| Extender [1] | 2.9 | |
| 50% aqueous sodium hydroxide | 7.8 | 0.36 |
| 100% phenol | 23.6 | 1.0 |
| 50% aqueous formaldehyde | 31.4 | 2.1 |
| 50% aqueous sodium hydroxide | 4.0 | 0.25 |

[1] Silvacon 490, a finely divided Douglas fir bark product with a long history of use as a phenolic plywood adhesive extender. Mesh size: 85% through a No. 325 screen, 60% through a No. 400 screen.

The procedure employed in Example I, Part A is followed except that the 70° F. viscosity reached is about 1395 centipoises. The resulting adhesive contains about 40% total solids and a very short useful life, i.e. less than about 1 day, due to separation.

Example III

This example illustrates the preparation of ready-to-use phenolic adhesives for use in the manufacture of plywood in accordance with this invention and incorporating an amylaceous material.

PART A

| Material: | Parts by weight | Molar proportion |
|---|---|---|
| Water | 28.6 | |
| Fine-grind furafil | 4.9 | |
| Milo starch [1] | 1.0 | |
| 50% aqueous sodium hydroxide | 7.1 | 0.36 |
| 100% phenol | 23.0 | 1.0 |
| 50% aqueous formaldehyde | 30.2 | 2.06 |
| 50% aqueous sodium hydroxide | 5.2 | 0.25 |

[1] A sorghum starch.

The procedure employed in Example I, Part A is followed except that the milo starch is charged with the water and extender, and the 70° F. viscosity reached is about 1540 centipoises. The resulting adhesive contains about 43.0% total solids and has a useful storage life of about 2 weeks.

PART B

| Material: | Parts by weight | Molar proportion |
|---|---|---|
| Water | 29.5 | |
| Fine-grind furafil | 4.8 | |
| Milo starch [1] | 1.0 | |
| 50% aqueous sodium hydroxide | 6.7 | 0.36 |
| 100% phenol | 21.8 | 1.0 |
| 50% aqueous formaldehyde | 31.5 | 2.25 |
| 50% aqueous sodium hydroxide | 4.7 | 0.25 |

[1] A sorghum starch.

The procedure employed in Part A, above, is followed. The resulting adhesive contains about 42.0% total solids and has a useful storage life of about 2 weeks at 70° F.

PART C

| Material: | Parts by weight | Molar proportion |
|---|---|---|
| Water | 29.4 | |
| Fine-grind furafil | 4.8 | |
| Potato starch [1] | .5 | |
| 50% aqueous sodium hydroxide | 6.8 | 0.36 |
| 100% phenol | 22.0 | 1.0 |
| 50% aqueous formaldehyde | 31.8 | 2.25 |
| 50% aqueous sodium hydroxide | 4.7 | 0.25 |

[1] Crown Powdered Potato Starch, a product of Penick and Ford.

The procedure employed in Part A, above, is followed. The resulting adhesive contains about 42.0% solids and has a useful storage life of about 2 weeks at 70° F.

Example IV

This example illustrates the preparation of 5-ply plywood using the aforedescribed adhesives and varying assembly times for each adhesive. Pertinent information defining the plywood panel, adhesive, preparation and strength results is presented in the following tables.

TABLE A.—PANELS

| No. | Adhesives | | | Veneers,[c] moisture percent | Press conditions[d] | |
|---|---|---|---|---|---|---|
| | Example | Viscosity[a] | Spread[b] | | Pressure (p.s.i.) | Time (min.) |
| 1 | I-A | 2,350 | 57 | 1-2 | 200 | 7 |
| 2 | I-B | 1,610 | 46 | 0-2 | 200 | 6.5 |
| 3 | I-C | 1,270 | 50 | 0-2 | 225 | 6.5 |
| 4 | I-D | 1,675 | 45-50 | 3-4 | 200 | 6.5 |
| 5 | I-E | | 45-50 | 5-6 | 200 | 4.5 |
| 6 | I-F | 2,040 | 45-50 | 4-6 | 200 | 7.5 |
| 7 | II | | 45-50 | 0-2 | 200 | 6.5 |
| 8 | III-A | 1,550 | | | 175 | 7.5 |
| 9 | III-B | 1,515 | | | 175 | 7.5 |
| 10 | III-C | 1,622 | | | 175 | 7.5 |

[a] At 70° F.—centipoises.
[b] Pounds/MDGL.
[c] Panel No. 2 is Douglas fir. All other panels are Southern pine. Veneers for panels Nos. 1-3 are redried for 2 hours at 230° F. and for panel No. 7, 1½ hours at 230° F.
[d] All panels are consolidated at a platen temperature of 300° F.

TABLE B

| No. | Panel | | Shear test | | |
|---|---|---|---|---|---|
| | Assembly time (min.) | Thickness (inches) | Dry | Boil | Vac-press |
| 1-A | 3 | ¾ | 255-96 | 143-100 | 170-100 |
| 1-B | 10 | ¾ | 292-100 | 203-100 | 242-96 |
| 1-C | 20 | ¾ | 298-100 | 170-100 | 220-100 |
| 1-D | 30 | ¾ | 230-98 | 148-97 | 155-97 |
| 1-E | 40 | ¾ | 302-98 | 173-97 | 203-94 |
| 2-A | 3 | 13/16 | 325-100 | 218-100 | 250-98 |
| 2-B | 10 | 13/16 | 282-100 | 240-97 | 275-98 |
| 2-C | 20 | 13/16 | 285-95 | 215-98 | 243-97 |
| 2-D | 30 | 13/16 | 296-100 | 228-100 | 255-92 |
| 2-E | 40 | 13/16 | 283-100 | 215-98 | 237-95 |
| 3-A | 3 | 1 1/16 | 278-98 | 197-98 | 198-96 |
| 3-B | 10 | 1 1/16 | 243-100 | 197-96 | 200-100 |
| 3-C | 20 | 1 1/16 | 212-98 | 182-94 | 155-91 |
| 3-D | 30 | 1 1/16 | 250-94 | 178-96 | 180-80 |
| 3-E | 40 | 1 1/16 | 109-98 | 118-95 | 118-88 |
| 4-A | 3 | ⅝ | 208-83 | 142-91 | 177-83 |
| 4-B | 10 | ⅝ | 250-96 | 155-93 | 158-94 |
| 4-C | 20 | ⅝ | 281-97 | 304-98 | 298-79 |
| 4-D | 30 | ⅝ | 222-98 | 131-96 | 158-93 |
| 4-E | 40 | ⅝ | 313-98 | 250-94 | 250-97 |
| 5-A | 2 | ½ | 375-92 | 264-94 | 317-96 |
| 5-B | 10 | ½ | 352-82 | 310-82 | 343-78 |
| 5-C | 20 | ½ | 307-97 | 210-77 | 218-98 |
| 5-D | 30 | ½ | 332-68 | 177-94 | 223-85 |
| 5-E | 40 | ½ | 310-91 | 195-78 | 230-88 |
| 6-A | 3 | ¾ | 191-97 | 151-97 | 160-96 |
| 6-B | 10 | ¾ | 213-98 | 135-97 | 145-96 |
| 6-C | 20 | ¾ | 195-90 | 133-99 | 135-99 |
| 6-D | 30 | ¾ | 181-90 | 105-98 | 128-90 |
| 6-E | 40 | ¾ | 335-91 | 181-96 | 215-86 |
| 7-A | 3 | ⅝ | 227-84 | 160-86 | 148-87 |
| 7-B | 20 | ⅝ | 258-91 | 161-77 | 208-70 |
| 7-C | 40 | ⅝ | 257-93 | 212-48 | 172-67 |
| 8-A | 3 | ¾ | 320-100 | 230-100 | 232-100 |
| 8-B | 10 | ¾ | 342-98 | 288-99 | 258-78 |
| 8-C | 20 | ¾ | 255-100 | 236-100 | 242-100 |
| 8-D | 30 | ¾ | 276-100 | 225-98 | 214-100 |
| 8-E | 40 | ¾ | 293-97 | 193-100 | 222-100 |
| 9-A | 3 | ¾ | 246-100 | 216-100 | 236-100 |
| 9-B | 10 | ¾ | 240-95 | 130-100 | 160-100 |
| 9-C | 20 | ¾ | 266-81 | 180-92 | 224-92 |
| 9-D | 30 | ¾ | 258-97 | 171-100 | 203-100 |
| 9-E | 40 | ¾ | 285-99 | 194-95 | 236-95 |
| 10-A | 3 | ¾ | 405-92 | 292-97 | 280-96 |
| 10-B | 10 | ¾ | 315-100 | 213-78 | 237-97 |
| 10-C | 20 | ¾ | 390-93 | 302-96 | 296-90 |
| 10-D | 30 | ¾ | 358-92 | 235-96 | 288-96 |
| 10-E | 40 | ¾ | 292-96 | 258-100 | 258-96 |

Conventional adhesive fillers, such as bark flour, nut shell flours, wood flour, clays, etc. are not satisfactory in this invention because of instability and/or failure to bonding performance.

The adhesive compositions of the invention have the advantage over conventional plywood adhesive formulations in that they are stable, uniform, ready-to-use compositions which prepress well and permit use of higher press temperatures in consolidating plywood panels when applied at the spread ranges shown. They offer unique versatility, being suitable at once for interior and exterior softwood plywood as well as interior and premium grades of hardwood plywood. The instant adhesives offer the further important advantage of consolidating veneers having a moisture content greater than heretofore found practical. The ability to work with wetter veneers in the manufacture of plywood is a large economic advantage in that time consumed drying the veneers is substantially shortened, loss of bonding properties through overdrying is eliminated and veneer losses due to sheet breakage in handling are sharply reduced.

In some applications where increased water-holding properties and initial tack of the adhesive is desired, amylaceous materials in general and particularly refined starches such as milo (sorghum), corn and potato starches can be present in the adhesive compositions of this invention. As shown in Example III, adhesive compositions of this invention modified with a starch exhibit uniform excellent adhesion, particularly at the longer assembly times. In general, from 0 to 10 percent by weight of resin solids of an amylaceous material can be employed in this invention.

The adhesive compositions of this invention can contain from about 20 to about 60 percent phenolic resin on a solids basis. Generally, about 40 percent phenolic resin solids are employed in the adhesive compositions of this invention.

Various modifications and alterations to the adhesive composition and process disclosed herein will become apparent to those skilled in the art, without departing from the spirit and scope of this invention.

What is claimed is:

1. A stable thermosetting adhesive composition consisting of an aqueous dispersion containing in the ratio of:
    (a) 100 parts of a water-soluble phenol-aldehye resin,
    (b) 5 to 25 parts of a material obtained by alkali digestion of a solid by-product residue from the acid hydrolysis of a pentosan-containing material having a particle size distribution before digestion such that at least 75% passes a 325-mesh standard screen and at least 50% passes a 40-mesh standard screen, and
    (c) 0 to 10 parts of an amylaceous material, said composition being stable for at least two weeks.

2. A composition as in claim 1 wherein said pentosan-containing material is selected from the group consisting of ground oat hulls and ground corn cobs.

3. A composition as in claim 2 wherein said particle size distribution of said residue before digestion is such that at least 85 percent passes a 325-mesh standard screen and at least 60 percent passes a 40-mesh standard screen.

4. A composition as in claim 3 wherein said phenol-aldehyde resin is a phenol-formaldehyde resin.

5. The composition of claim 4 wherein the digesting agent is sodium hydroxide.

6. The composition of claim 1 wherein the amylaceous material is a refined starch and the composition contains 0.2 to 5 parts thereof.

7. The method for the production of a stable aqueous thermosetting adhesive composition comprising:
(a) digesting a solid by-product residue from the acid hydrolysis of a pentosan-containing material having a particle size distribution such that at least 75 percent passes a 325-mesh standard screen and at least 50 percent passes a 400-mesh standard screen in an aqueous medium with a water-soluble alkali, and
(b) condensing and resinifying phenol and an aldehyde in the aqueous slurry of step (a).

8. The method of claim 7 wherein step (a) is conducted with agitation at 70 to 120° F. for from 10 to 30 minutes and said water-soluble alkali is an alkali metal salt whose 0.1N aqueous solution has a pH of greater than 9.5, and in step (b) the phenol and aldehyde are condensed in the slurry of step (a) until a 70° F. MacMichael 26s viscosity in the range of 50 to 100 is reached and then resinified in the presence of additional alkali until a 70° F. MacMichael 26s viscosity in the range of 40 to 1000 is reached.

9. The method of claim 7 wherein an amylaceous material is added during step (a).

10. The method of claim 8 wherein
(1) said residue is suspended in water at 50–100° F.;
(2) said alkali is added and the mixture is agitated for from about 10 to 30 minutes–
(3) said phenol and formaldehyde are added and reacted at about 150° F. for 0 to 60 minutes, refluxed under atmospheric conditions for about 25 minutes, and reacted at 180° F. until a 70° F. MacMichael 26s viscosity of from 50 to 100 is reached; and
(4) said additional alkali is added and the total charge reacted at about 170° F. until a 70° F. MacMichael viscosity of from 40 to 1000 is reached; the quantities of water, residue, alkali, phenol and formaldehyde being such that the composition contains a total solids of from about 40 to 60 percent, 2 to 10 parts of residue, and 20 to 60 parts of an alkaline catalyzed phenol-formaldehyde resin having a mol ratio of phenol:formaldehyde of 1:1.8 to 1:2.25.

11. The method of claim 10 wherein said residue has a particle size distribution such that at least 75 percent passes a 325-mesh screen and at least 60 percent passes a 400-mesh screen and said alkali is sodium hydroxide.

References Cited
UNITED STATES PATENTS

| | | | |
|---|---|---|---|
| 3,215,653 | 11/1965 | Hughes | 260—17.2 |
| 3,258,436 | 6/1966 | Stephens | 260—17.2 |
| 3,282,869 | 11/1966 | Bryner | 260—17.2 |

WILLIAM H. SHORT, Primary Examiner

E. WOODBERRY, Assistant Examiner

U.S. Cl. X.R.

106—288; 161—262

UNITED STATES PATENT OFFICE
CERTIFICATE OF CORRECTION

Patent No. 3,580,872　　　　　Dated May 25, 1971

Inventor(s) Alan L. Lambuth

It is certified that error appears in the above-identified patent and that said Letters Patent are hereby corrected as shown below:

Column 1, line 38, "ahesives" should be -- adhesives -- .

Column 1, line 43, "2,728,869" should be -- 2,727,869 -- .

Column 1, line 49, "phenolformaldehyde" should be -- phenol-formaldehyde -- .

Column 2, line 4, "the" should be -- by -- .

Column 3, line 55, "tabout" should be -- about -- .

Column 4, line 23, insert -- under -- between the words line and test.

Column 5, line 6, "aobut" should be -- about -- .

Column 5, line 45, "sodiu" should be -- sodium -- .

Column 5, line 58, "10%" should be -- 100% -- .

Column 7, Table B, fourth column, line 41, "109-98" should be -- 190-98 -- .

Column 7, Table B, sixth column, line 43, "298-79" should be -- 298-97 -- .

Column 7, line 67, insert -- contribute usefully to adhesive working properties or -- after the words failure to Column 8, line 68, "40-mesh" should be -- 400-mesh -- .

Column 8, line 58, "40-mesh" should be -- 400-mesh -- .

Signed and sealed this 16th day of November 1971.

(SEAL)
Attest:

EDWARD M. FLETCHER, JR.　　　　ROBERT GOTTSCHALK
Attesting Officer　　　　　　　　Acting Commissioner of Patents